(12) United States Patent
Pinheiro et al.

(10) Patent No.: US 8,243,676 B2
(45) Date of Patent: Aug. 14, 2012

(54) WIRELESS COMMUNICATION METHOD OF SELECTING AN ENHANCED UPLINK TRANSPORT FORMAT COMBINATION

(75) Inventors: Ana Lucia Pinheiro, West Chester, PA (US); Marian Rudolf, Vitre (FR); John Haim, Baldwin, NY (US)

(73) Assignee: Nufront Mobile Communications Technology Co., Ltd., Beijing (CN)

( * ) Notice: Subject to any disclaimer, the term of this patent is extended or adjusted under 35 U.S.C. 154(b) by 0 days.

(21) Appl. No.: 13/210,049

(22) Filed: Aug. 15, 2011

(65) Prior Publication Data

US 2011/0299497 A1    Dec. 8, 2011

Related U.S. Application Data

(63) Continuation of application No. 11/773,579, filed on Jul. 5, 2007, now Pat. No. 8,000,291.

(60) Provisional application No. 60/818,848, filed on Jul. 6, 2006.

(51) Int. Cl.
*H04W 4/00* (2009.01)

(52) U.S. Cl. ........ 370/329; 370/332; 370/328; 370/232; 455/450; 455/455; 455/67.11

(58) Field of Classification Search ................ 455/450, 455/455, 67.11; 370/332, 329, 238, 232
See application file for complete search history.

(56) References Cited

U.S. PATENT DOCUMENTS

| | | | |
|---|---|---|---|
| 5,280,472 | A | 1/1994 | Gilhousen et al. |
| 6,788,652 | B1 | 9/2004 | Hwang |
| 6,850,540 | B1 | 2/2005 | Peisa et al. |
| 7,227,851 | B1 | 6/2007 | Gopalakrishnan et al. |
| 7,408,895 | B2 | 8/2008 | Zhang et al. |

(Continued)

FOREIGN PATENT DOCUMENTS

EP    1063818    12/2000

(Continued)

OTHER PUBLICATIONS

3GPP, 3$^{rd}$ Generation Partnership Project; Technical Specification Group Radio Access Network; Spreading And Modulation (FDD) (Release 1999), 3GPP TS 25.213 V3.9.0, (Dec. 2003).

(Continued)

*Primary Examiner* — Kwasi Karikari
(74) *Attorney, Agent, or Firm* — Morgan, Lewis & Bockius LLP

(57) ABSTRACT

Methods of selecting an enhanced uplink (EU) transport format combination (E-TFC) are disclosed. A maximum number of bits of scheduled data for an upcoming transmission may be determined, wherein the highest value is lower or equal to:

$$K_{e,ref} \cdot \frac{SG}{L_{e,ref} \cdot A_{ed,ref}^2 \cdot 10^{\Delta harq/10}},$$

where SG is a serving grant, $L_{e,ref}$ is the number of EU dedicated physical data channels (E-DPDCHs) used for a selected reference E-TFC, $K_{e,ref}$ is the number of data bits of the reference E-TFC, $\Delta_{harq}$ is a hybrid automatic repeat request (HARQ) offset for a specific data flow to be transmitted as signaled by higher layers, and $A_{ed,ref}$ is a ratio derived from a parameter ΔE-DPDCH signaled by higher layers for the selected reference E-TFC.

15 Claims, 8 Drawing Sheets

U.S. PATENT DOCUMENTS

| | | | |
|---|---|---|---|
| 7,729,715 B2* | 6/2010 | Love et al. | 455/522 |
| 2004/0131026 A1 | 7/2004 | Kim et al. | |
| 2004/0162083 A1 | 8/2004 | Chen et al. | |
| 2004/0219920 A1 | 11/2004 | Love et al. | |
| 2005/0192011 A1 | 9/2005 | Hong et al. | |
| 2005/0249133 A1 | 11/2005 | Terry et al. | |
| 2005/0265301 A1 | 12/2005 | Heo et al. | |
| 2005/0266846 A1 | 12/2005 | Kim | |
| 2006/0013268 A1 | 1/2006 | Terry | |
| 2006/0120404 A1 | 6/2006 | Sebire et al. | |
| 2006/0143444 A1 | 6/2006 | Malkamaki et al. | |
| 2006/0182065 A1* | 8/2006 | Petrovic et al. | 370/332 |
| 2006/0183428 A1 | 8/2006 | Heo et al. | |
| 2007/0073895 A1 | 3/2007 | Sebire et al. | |
| 2007/0121542 A1 | 5/2007 | Lohr et al. | |
| 2007/0155335 A1 | 7/2007 | Love et al. | |
| 2008/0089296 A1 | 4/2008 | Kazmi et al. | |
| 2008/0158184 A1 | 7/2008 | Land | |
| 2008/0254804 A1 | 10/2008 | Lohr et al. | |

FOREIGN PATENT DOCUMENTS

| | | |
|---|---|---|
| EP | 1643690 | 4/2006 |
| JP | 2006-191320 | 7/2006 |
| WO | 99/44315 | 9/1999 |
| WO | 01/63857 | 8/2001 |
| WO | 02/065675 | 8/2002 |
| WO | 2006/113829 | 10/2006 |
| WO | 2006/118831 | 11/2006 |

OTHER PUBLICATIONS

3GPP, $3^{rd}$ Generation Partnership Project; Technical Specification Group Radio Access Network; Spreading And Modulation (FDD) (Release 4), 3GPP TS 25.213 V4.4.0, (Dec. 2003).

3GPP, $3^{rd}$ Generation Partnership Project; Technical Specification Group Radio Access Network; Spreading And Modulation (FDD) (Release 5), 3GPP TS 25.213 V5.6.0, (Jun. 2005).

3GPP, $3^{rd}$ Generation Partnership Project; Technical Specification Group Radio Access Network; Spreading And Modulation (FDD) (Release 6), 3GPP TS 25.213 V6.2.0, (Mar. 2005).

3GPP, $3^{rd}$ Generation Partnership Project; Technical Specification Group Radio Access Network; Spreading And Modulation (FDD) (Release 6), 3GPP TS 25.213 V6.5.0, (Mar. 2006).

3GPP, $3^{rd}$ Generation Partnership Project; Technical Specification Group Radio Access Network; Spreading And Modulation (FDD) (Release 7), 3GPP TS 25.213 V7.0.0, (Mar. 2006).

3GPP, $3^{rd}$ Generation Partnership Project; Technical Specification Group Radio Access Network; Spreading And Modulation (FDD) (Release 7), 3GPP TS 25.213 V7.2.0, (May 2007).

3GPP, $3^{rd}$ Generation Partnership Project; Technical Specification Group Radio Access Network; Physical Layer Procedures (FDD) (Release 1999), 3GPP TS 25.214 V3.12.0, (Mar. 2003).

3GPP, $3^{rd}$ Generation Partnership Project; Technical Specification Group Radio Access Network; Physical Layer Procedures (FDD) (Release 4), 3GPP TS 25.214 V4.6.0, (Mar. 2003).

3GPP, $3^{rd}$ Generation Partnership Project; Technical Specification Group Radio Access Network; Physical layer Procedures (FDD) (Release 5), 3GPP TS 25.214 V5.10.0 (Dec. 2004).

3GPP, $3^{rd}$ Generation Partnership Project; Technical Specification Group Radio Access Network; Physical Layer Procedures (FDD) (Release 5), 3GPP TS 25.214 V5.11.0, (Jun. 2005).

3GPP, $3^{rd}$ Generation Partnership Project; Technical Specification Group Radio Access Network; Physical Layer Procedures (FDD) (Release 6), 3GPP TS 25.214 V6.9.0, (Jun. 2006).

3GPP, $3^{rd}$ Generation Partnership Project; Technical Specification Group Radio Access Network; Physical Layer Procedures (FDD) (Release 6), 3GPP TS 25.214 V6.11.0, (Dec. 2006).

3GPP, $3^{rd}$ Generation Partnership Project; Technical Specification Group Radio Access Network; Physical Layer Procedures (FDD) (Release 7), 3GPP TS 25.214 V7.1.0, (Jun. 2006).

3GPP, $3^{rd}$ Generation Partnership Project; Technical Specification Group Radio Access Network; Physical Layers Procedures (FDD) (Release 7), 3GPP TS 25.214 V7.5.0, (May 2007).

3GPP, $3^{rd}$ Generation Partnership Project; Technical Specification Group Radio Access Network; FDD Enhanced Uplink: Overall description; Stage 2 (Release 6), 3GPP TS 25.309 V6.6.0 (Mar. 2006).

3GPP, $3^{rd}$ Generation Partnership Project; Technical Specification Group Radio Access Network; Medium Access Control (MAC) Protocol Specification (Release 1999), 3GPP TS 25.321 V3.17.0, (Jun. 2004).

3GPP, $3^{rd}$ Generation Partnership Project; Technical Specification Group Radio Access Network; Medium Access Control (MAC) Protocol Specification (Release 4), 3GPP TS 25.321 V4.10.0, (Jun. 2004).

3GPP, 3rd Generation Partnership Project; Technical Specification Group Radio Access Network; Medium Access Control (MAC) protocol specification (Release 5), 3GPP TS 25.321 V5.10.0 (Dec. 2004).

3GPP, $3^{rd}$ Generation Partnership Project; Technical Specification Group Radio Access Network; Medium Access Control (MAC) Protocol Specification (Release 5), 3GPP TS 25.321 V5.12.0, (Sep. 2005).

3GPP, $3^{rd}$ Generation Partnership Project; Technical Specification Group Radio Access Network; Medium Access Control (MAC) Protocol Specification (Release 5), 3GPP TS 25.321 V5.13.0, (Mar. 2007).

3GPP, $3^{rd}$ Generation Partnership Project; Technical Specification Group Radio Access Network; Medium Access Control (MAC) Protocol Specification (Release 6), 3GPP TS 25.321 V6.9.0, (Jun. 2006).

3GPP, $3^{rd}$ Generation Partnership Project; Technical Specification Group Radio Access Network; Medium Access Control (MAC) Protocol Specification (Release 6), 3GPP TS 25.321 V6.12.0, (Mar. 2007).

3GPP, $3^{rd}$ Generation Partnership Project; Technical Specification Group Radio Access Network; Medium Access Control (MAC) Protocol Specification (Release 7), 3GPP TS 25.321 V7.1.0, (Jun. 2006).

3GPP, $3^{rd}$ Generation Partnership Project; Technical Specification Group Radio Access Network; Medium Access Control (MAC) Protocol Specification (Release 7), 3GPP TS 25.321 V7.4.0, (Mar. 2007).

Ericsson et al., "Clarification on Calculation of Scheduled Grant Payload," 3GPP TSG-WG2 Meeting #58, R2-072227 (May 7-11, 2007).

Ericsson, "Clarification on Calculation of 'Scheduled Grant Payload,'" 3GPP TSG-WG2 Meeting #58, R2-071850, Kobe, Japan, (May 7, 2007).

Ericsson, "Clarification on calculation of 'Scheduled Grant Payload,'" 3GPP TSG-RAN WG2 Meeting #58, R2-072328, Kobe, Japan, (May 7, 2007).

Lucent, "Scheduled and Autonomous Mode Operation for the Enhanced Uplink," 3GPP TSG RAN WG1 #31, R1-03-0284, Tokyo, Japan (Feb. 17-20, 2003).

NEC, "Recommandation on RLC PDU size selection on E-DCH" 3GPP TSG-RAN WG2 Meeting #58, 3GPP TSG-RAN WG2 Meeting #58 (May 7-11, 2007).

Parkvall et al., "WCDMA Enhanced Uplink—Principles And Basic Operation", 2005 IEEE $61^{st}$ Vehicular Technology Conference, VTC 2005-Spring. vol. 3, No. 30, pp. 1411-1415, (May 30-Jun. 1, 2005).

Qualcomm, "TFC Selection Scheme details," 3GPP TSG-RAN WG2 meeting #46, R2-050457, Scottsdale, AZ, USA, (Feb. 14, 2005).

Rohde & Schwarz GmbH & Co. KG, High Speed Uplink Packet Access (HSUPA) White Paper, Application Note 1MA94, (Jan. 2006).

* cited by examiner

WIRELESS COMMUNICATION METHOD OF SELECTING AN ENHANCED UPLINK TRANSPORT FORMAT COMBINATION

CROSS REFERENCE TO RELATED APPLICATIONS

This application is a continuation of U.S. application Ser. No. 11/773,579 filed Jul. 5, 2007, which claims the benefit of U.S. Provisional Application No. 60/818,848 filed Jul. 6, 2006. These applications are incorporated by reference as if fully set forth.

This application is related to U.S. patent application Ser. No. 11/408,415 filed on Apr. 21, 2006, which is incorporated by reference as if fully set forth.

FIELD OF INVENTION

The present invention is related to wireless communications. More particularly, the present invention is related to a method of determining a maximum number of bits of scheduled data for an upcoming transmission and selecting enhanced uplink (EU) transport format combinations (E-TFCs).

BACKGROUND

Figure 1:
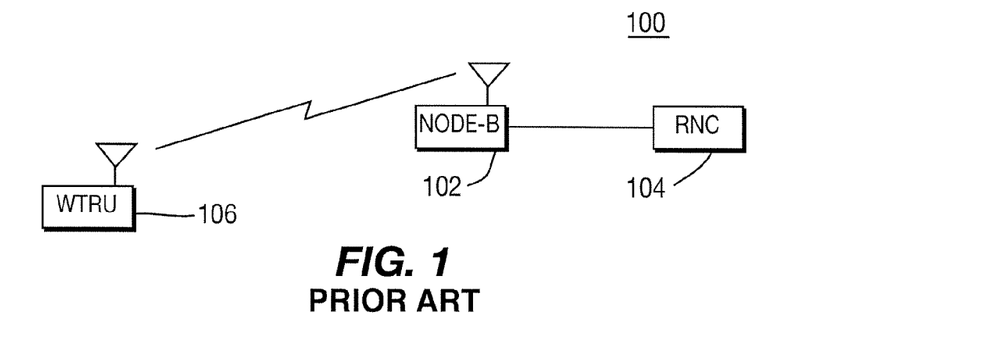
FIG. 1 shows a 3G cellular system.

In a Third Generation (3G) cellular system, such as the system 100 shown in FIG. 1, EU provides improvements to uplink (UL) data throughput and transmission latency. The system 100 includes a Node-B 102, a radio network controller (RNC) 104 and a wireless transmit/receive unit (WTRU) 106.

Figure 2:
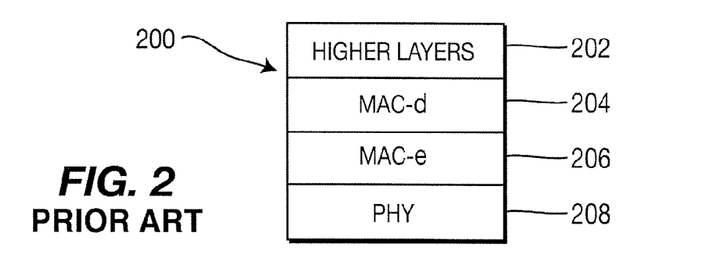
FIG. 2 shows an EU protocol architecture in a WTRU.

As shown in FIG. 2, the WTRU 106 includes a protocol architecture 200 which includes higher layers 202 and an EU medium access control (MAC), (MAC-e) 206, used to support EU operation between a dedicated channel MAC, (MAC-d) 204, and a physical layer (PHY) 208. The MAC-e 206 receives data for EU transmission from channels known as MAC-d flows. The MAC-e 206 is responsible for multiplexing data from MAC-d flows into MAC-e protocol data units (PDUs) for transmission, and for selecting proper EU transport format combinations (E-TFCs) for EU transmissions.

To allow for EU transmissions, physical resource grants are allocated to the WTRU 106 by the Node-B 102 and the RNC 104. WTRU UL data channels that require fast dynamic channel allocations are provided with fast "scheduled" grants provided by the Node-B 102, and channels that require continuous allocations are provided with "non-scheduled" grants by the RNC 104. The MAC-d flows provide data for UL transmission to the MAC-e 206. The MAC-d flows are either configured as scheduled or non-scheduled MAC-d flows.

An SG is the grant for scheduled data, (i.e., a "scheduled grant"). A "non-scheduled grant" is the grant for non-scheduled data. The SG is the power ratio that is converted to a corresponding amount of scheduled data that can be multiplexed, thus resulting in the scheduled data grant.

The RNC 104 configures non-scheduled grants for each MAC-d flow using radio resource control (RRC) procedures. Multiple non-scheduled MAC-d flows can be configured simultaneously in the WTRU 106. This configuration is typically performed upon radio access bearer (RAB) establishment, but may be reconfigured when necessary. The non-scheduled grant for each MAC-d flow specifies the number of bits that can be multiplexed into a MAC-e PDU. The WTRU 106 is then allowed to transmit non-scheduled transmissions up to the sum of non-scheduled grants, if multiplexed in the same transmission time interval (TTI).

Based on scheduling information sent in rate requests from the WTRU 106, the Node-B 102 dynamically generates scheduling grants for scheduled MAC-d flows. Signaling between the WTRU 106 and the Node-B 102 is performed by fast MAC layer signaling. The scheduling grant generated by the Node-B 102 specifies the maximum allowed EU dedicated physical data channel (E-DPDCH)/dedicated physical control channel (DPCCH) power ratio. The WTRU 106 uses this power ratio and other configured parameters to determine the maximum number of bits that can be multiplexed from all scheduled MAC-d flows into a MAC-e PDU.

Scheduled grants are "on top of" and mutually exclusive of non-scheduled grants. Scheduled MAC-d flows can not transmit data using a non-scheduled grant, and non-scheduled MAC-d flows can not transmit data using a scheduled grant.

The EU transport format combination set (E-TFCS) comprising all possible E-TFCs is known to the WTRU 106. For each EU transmission, an E-TFC is selected from a set of supported E-TFCs within the E-TFCS.

Since other UL channels take precedence over EU transmissions, the power available for EU data transmission on E-DPDCH is the remaining power after the power required for DPCCH, dedicated physical data channel (DPDCH), high speed dedicated physical control channel (HS-DPCCH) and EU dedicated physical control channel (E-DPCCH) is taken into account. Based on the remaining transmit power for EU transmission, blocked or supported states of E-TFCs within the E-TFCS are continuously determined by the WTRU 106.

Each E-TFC corresponds to a number of MAC layer data bits that can be transmitted in an EU TTI. Since there is only one MAC-e PDU per E-TFC that is transmitted in each EU TTI, the largest E-TFC that is supported by the remaining power defines the maximum amount of data, (i.e., the number of bits), that can be transmitted within a MAC-e PDU.

Multiple scheduled and/or non-scheduled MAC-d flows may be multiplexed within each MAC-e PDU based on absolute priority. The amount of data multiplexed from each MAC-d flow is the minimum of the current scheduled or non-scheduled grant, the available MAC-e PDU payload from the largest supported TFC, and the data available for transmission on the MAC-d flow.

Within the supported E-TFCs, the WTRU 106 selects the smallest E-TFC that maximizes the transmission of data according to the scheduled and non-scheduled grants. When scheduled and non-scheduled grants are fully utilized, available MAC-e PDU payload is fully utilized, or the WTRU 106 has no more data available and allowed to be transmitted, MAC-e PDUs are padded to match the next largest E-TFC size. This multiplexed MAC-e PDU and corresponding TFC are passed to the physical layer for transmission.

The SGs and non-SGs specify the maximum amount of data that can be multiplexed from specific MAC-d flows into MAC-e PDUs each EU TTI. Since the scheduled grants are based on the E-DPDCH/DPCCH ratio, the number of data bits allowed to be multiplexed per MAC-e PDU can not be explicitly controlled only to allow certain sizes which match the limited number of data sizes of the supported E-TFCs within the E-TFCS.

The remaining transmit power for EU data transmission determines the list of supported E-TFCs within the E-TFCS. Since the supported E-TFCs are determined from a limited number of E-TFCs in the TFCS, the granularity of allowed MAC-e PDU sizes will not allow for all possible MAC-d flow and MAC-e header combinations. Therefore, since the amount of MAC-d flow data allowed by the grants to be multiplexed into a MAC-e PDU will frequently not match the size of one of the supported E-TFCs, padding will be applied to the MAC-e PDU to match the smallest possible E-TFC size within the list of supported E-TFCs.

It is expected that when EU cells are operating at maximum capacity, the MAC-e PDU multiplexing is frequently limited by the SGs and non-SGs, and not limited by the largest supported E-TFC or the WTRU EU data available for transmission. In this case, depending on the granularity of specified E-TFCs within the E-TFCS padding required to match the selected E-TFC may exceed the multiplexing block size of MAC-d flow data including associated MAC-e header information. In this case, the effective data rate is unnecessarily reduced from what is allowed by the selected E-TFC and the physical resources required for its transmission.

Figure 3:
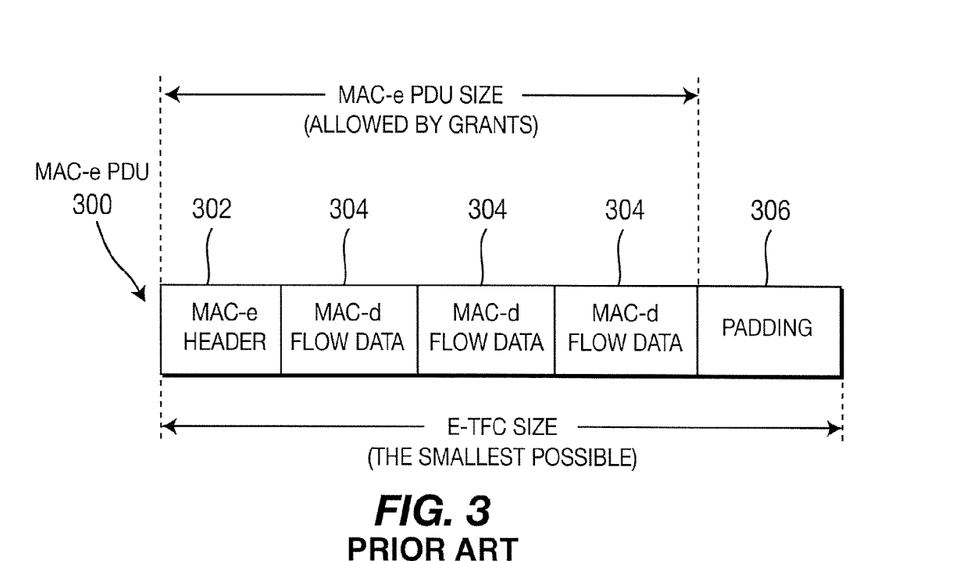
FIG. 3 illustrates a MAC-e PDU generation.

FIG. 3 illustrates a MAC-e PDU 300. A MAC-e PDU header 302 and MAC-d flow data 304 allowed by scheduling and non-scheduling grants are multiplexed. Among a set of supported E-TFCs, the WTRU 106 selects the smallest E-TFC from a list of supported E-TFCs that is larger than MAC-e PDU header 302 and MAC-d flow data 304. Padding 306 is then applied to the MAC-e PDU to match the selected E-TFC size. However, the padding 306 may exceed the multiplexing block size of MAC-d flow data. In this case, physical resources used in the EU transmission are under utilized and the effective WTRU data rate is unnecessarily reduced.

MAC-e PDU multiplexing logic provides more efficient data multiplexing and improved radio resource utilization for the cases where MAC-e PDU multiplexing is limited by scheduled and/or non-scheduled grants, and not limited by the largest supported E-TFC or available EU data for transmission. The amount of data allowed to be multiplexed from MAC-d flows into MAC-e PDUs according to the scheduled and non-scheduled grants is either increased or decreased to more closely match the next smaller or next larger E-TFC size relative to the amount of data allowed to be multiplexed by the scheduled and non-scheduled grants.

Figure 4:
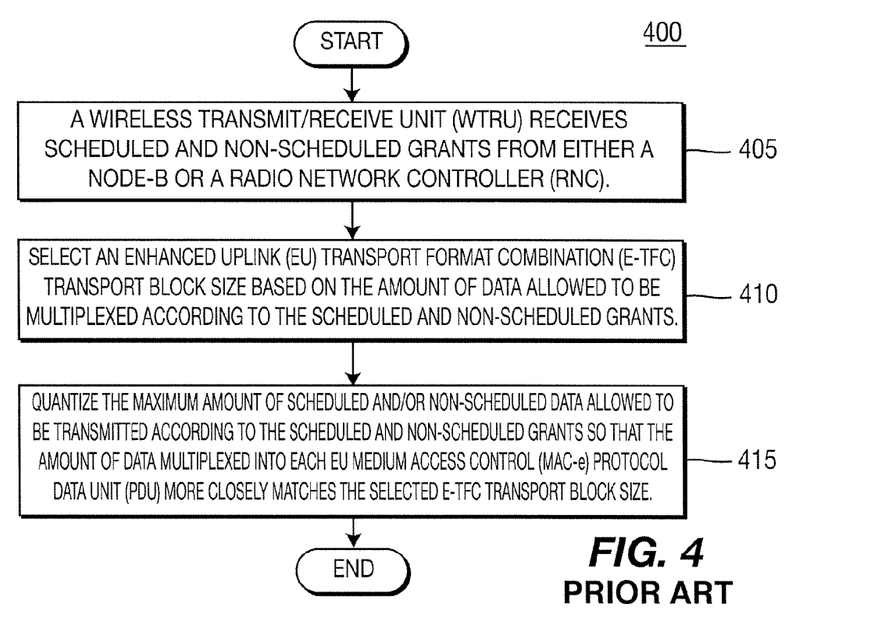
FIG. 4 is a flow diagram of a process for generating MAC-e PDUs by quantizing the maximum amount of scheduled and/or non-scheduled data allowed to be transmitted.

FIG. 4 is a flow diagram of a process 400 for generating MAC-e PDUs. In step 405, a WTRU receives a scheduled data grant from a Node-B and/or non-scheduled grants from an RNC. In step 410, an E-TFC transport block size is selected based on the amount of data allowed to be multiplexed according to the scheduled and non-scheduled grants. In step 415, the maximum amount of scheduled and/or non-scheduled data allowed to be transmitted according to the scheduled and non-scheduled grants is quantized so that the amount of data multiplexed into each MAC-e PDU more closely matches the selected E-TFC transport block size.

Figure 5:
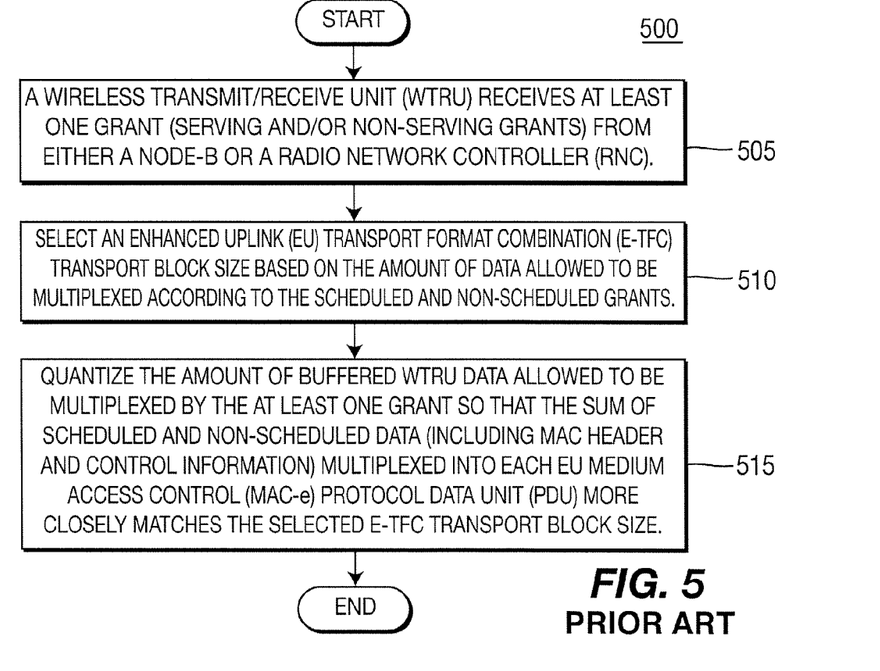
FIG. 5 is a block diagram of a process for generating MAC-e PDUs by quantizing the maximum amount of non-scheduled data allowed to be multiplexed.

FIG. 5 is a flow diagram of a process 500 for generating MAC-e PDUs. In step 505, a WTRU receives a scheduled data grant from a Node-B and/or non-scheduled grants from an RNC. In step 510, an E-TFC transport block size is selected based on the amount of data allowed to be multiplexed according to the scheduled and non-scheduled grants. In step 515, the amount of buffered WTRU data allowed to be multiplexed by the at least one grant is quantized so that the sum of scheduled and non-scheduled data (including MAC header and control information) multiplexed into each EU MAC-e PDU more closely matches the selected E-TFC transport block size.

Alternatively, granularity of E-TFC sizes is defined within the E-TFCS so that the difference between E-TFC sizes is not greater than one MAC-d PDU and the associated MAC-e header overhead. E-TFCs are defined for each possible MAC-d flow multiplexing combination and associated MAC-e header overhead. By optimizing the E-TFCS in this way, the padding required after MAC-d flow data is multiplexed according to the scheduled and non-scheduled grants will not exceed the size of possible MAC-d flow multiplexing block sizes.

Figure 6:
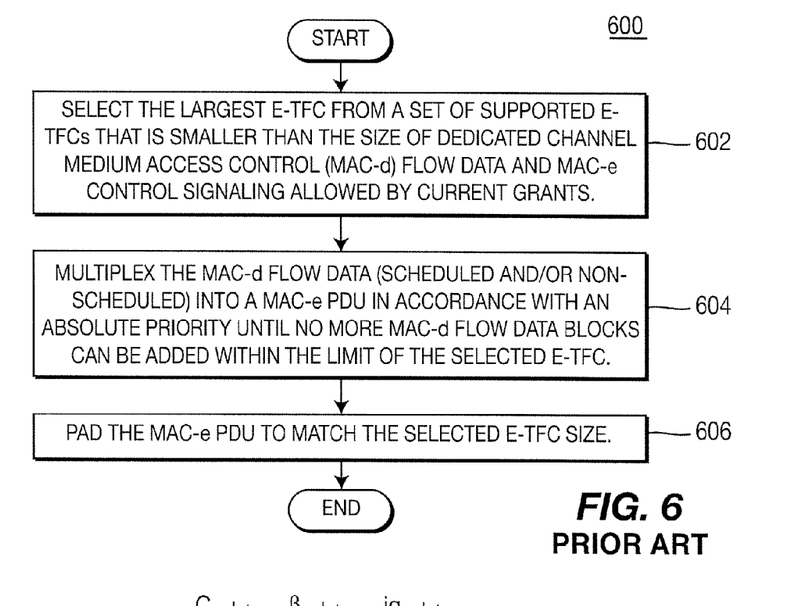
FIG. 6 is a flow diagram of a process for generating a MAC-e PDU by reducing multiplexed data.

FIG. 6 is a flow diagram of a process 600 for generating a MAC-e PDU. A largest E-TFC is selected from a set of supported E-TFCs that is smaller than the size of MAC-d flow data and MAC-e control signaling allowed by current grants 602. As a result, the selected E-TFC permits a decreased amount of data to be multiplexed onto the MAC-e PDU relative to the amount allowed by the grants, to more closely match the largest E-TFC size that is smaller than the amount required by scheduled and non-scheduled grants. The MAC-d flow data (scheduled and/or non scheduled) is multiplexed into a MAC-e PDU in accordance with an absolute priority until no more MAC-d flow data blocks can be added within the limit of the selected E-TFC 604. The MAC-e PDU is padded to match the selected E-TFC size 606.

Figure 7:
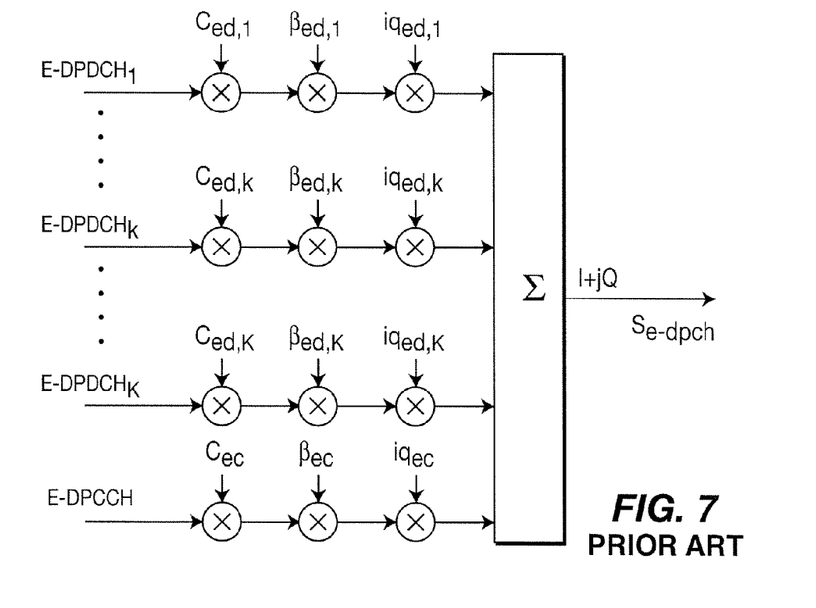
FIG. 7 shows conventional uplink spreading and gain factor usage for HSUPA.

FIG. 7 shows conventional uplink spreading and gain factor usage for high speed uplink power access (HSUPA). The power of the E-DPCCH and the E-DPDCH(s) is set relative to the DPCCH, such that gain factors are used for scaling the uplink channels relative to each other. As shown in FIG. 7, the gain factors are applied individually for E-DPCCH and each E-DPDCH. $\beta_{ec}$ is the gain factor for the E-DPCCH and $\beta_{ed,k}$ is the gain factor for the E-DPDCH(s). The WTRU derives these gain factors from higher layer signaling.

The E-DPCCH is scaled with the gain factor $\beta_{ec}$, which is given by:

$$\beta_{ec} = \beta_c \cdot A_{ec}; \qquad \text{Equation (1)}$$

where $\beta_c$ is the gain factor of the DPCCH. $\beta_c$ is either signaled by higher layers to the WTRU, or is computed. The ratio $A_{ec}$ is derived from the parameter $\Delta$E-DPCCH signaled by higher layers, (e.g., at call setup). Table 1 shows the meaning of the signaled values for $\Delta$E-DPCCH. The WTRU will scale the E-DPCCH in relation to the DPCCH according to the quantized amplitude ratio.

TABLE 1

| Signaled values for $\Delta$E-DPCCH | Quantized amplitude ratios $A_{ec} = \beta_{ec}/\beta_c$ |
| --- | --- |
| 8 | 30/15 |
| 7 | 24/15 |
| 6 | 19/15 |
| 5 | 15/15 |
| 4 | 12/15 |
| 3 | 9/15 |
| 2 | 8/15 |
| 1 | 6/15 |
| 0 | 5/15 |

During compressed frames, the E-DPCCH gain factor $\beta_{ec}$ needs to be scaled. This is performed in order to avoid that the E-DPCCH power is increased by the offset that is applied to the DPCCH during compressed frames. The uplink DPCCH slot formats that have TFCI bits contain fewer pilot bits than the formats for normal (non-compressed) mode. The reason for this is that the number of TFCI bits is always the same during a frame to ensure robust transport format detection. Therefore, in order to keep the same channel quality, the energy of the pilot must be kept equal, and the power of the DPCCH is therefore increased by the following factor: $N_{pilot, N}/N_{pilot, C}$.

Therefore, if a 2 ms TTI overlaps with a compressed frame:

$$\beta_{ec} = \beta_{c,C,j} \cdot A_{ec} \cdot \sqrt{\frac{N_{pilot,C}}{N_{pilot,N}}};\qquad \text{Equation (2)}$$

where $\beta_{c,C,j}$ is a beta factor for DPCCH in compressed frames for the $j^{th}$ transport format combination (TFC) such that $\beta_{c,C,j}=1$ when no DPDCH is configured, $N_{pilot,C}$ is the number of pilot bits per slot on DPCCH in compressed frames, and $N_{pilot,N}$ is the number of pilot bits per slot in non-compressed frames.

If a 10 ms TTI overlaps with a compressed frame, the E-DPCCH gain factor $\beta_{ec}$ is additionally scaled (increased) to take into account that less slots are available for transmission during this frame. In order to get a good transmission quality, the transmitted energy per information bit is the same, independent of whether compressed mode is used in a frame or not. Therefore, $\beta_{ec}$ is additionally scaled with the factor $15/N_{slots,C}$:

$$\beta_{ec} = \beta_{c,C,j} \cdot A_{ec} \cdot \sqrt{\frac{15 \cdot N_{pilot,C}}{N_{slots,C} \cdot N_{pilot,N}}};\qquad \text{Equation (3)}$$

where $N_{slots,C}$ is the number of non-discontinuous transmission (non-DTX) slots in this compressed frame.

As shown in FIG. 7, there can be one or more E-DPDCH(s), and each of them is scaled with its own gain factor. The gain factors may vary on radio frame basis or sub-frame basis depending on whether the E-DCH TTI is 10 ms or 2 ms, respectively. The gain factor $\beta_{ed,k}$ for the kth E-DPCCH is determined by the transport format combination on E-DCH (E-TFC) carried in this TTI, and depending on the hybrid automatic repeat request (HARQ) profile for the data carried in this TTI. The E-TFC describes the size of the transport block carried in a TTI. This parameter therefore influences the required transmission power.

For each data flow (MAC-d flow), higher layers can configure an individual HARQ profile. The HARQ profile includes the power offset and maximum number of HARQ retransmissions to use for this MAC-d flow. This can be used to fine-tune operating points for different data flows. The WTRU determines the gain factor $\beta_{ed,k}$ based on parameters signaled by higher layers, (e.g., at call setup).

First, a "reference E-TFC" needs to be determined in the WTRU for the E-TFC carried in the regarded TTI. A list of reference E-TFCs containing up to 8 reference E-TFCs is signaled by higher layers. The reference E-TFC is selected as close as possible to the regarded E-TFC. Then, a reference gain factor $\beta_{ed,ref}$ is determined for the selected reference E-TFC as follows:

$$\beta_{ed,ref} = \beta_c \cdot A_{ed,ref};\qquad \text{Equation (4)}$$

where $\beta_c$ is the gain factor of the DPCCH. The ratio $A_{ed,ref}$ is derived from the parameter ΔE-DPDCH signaled by higher layers for the selected reference E-TFC. Table 2 shows the meaning of the signaled values for ΔE-DPDCH. The reference E-TFC concept is used in order to avoid the signaling overhead which would result from signaling a ΔE-DPDCH value for all possible E-TFC values.

TABLE 2

| Signaled values for ΔE-DPDCH | Quantized amplitude ratios $A_{ed,ref} = \beta_{ed}/\beta_c$ |
|---|---|
| 29 | 168/15 |
| 28 | 150/15 |
| 27 | 134/15 |
| 26 | 119/15 |
| 25 | 106/15 |
| 24 | 95/15 |
| 23 | 84/15 |
| 22 | 75/15 |
| 21 | 67/15 |
| 20 | 60/15 |
| 19 | 53/15 |
| 18 | 47/15 |
| 17 | 42/15 |
| 16 | 38/15 |
| 15 | 34/15 |
| 14 | 30/15 |
| 13 | 27/15 |
| 12 | 24/15 |
| 11 | 21/15 |
| 10 | 19/15 |
| 9 | 17/15 |
| 8 | 15/15 |
| 7 | 13/15 |
| 6 | 12/15 |
| 5 | 11/15 |
| 4 | 9/15 |
| 3 | 8/15 |
| 2 | 7/15 |
| 1 | 6/15 |
| 0 | 5/15 |

However, this reference gain factor cannot directly be used for scaling the E-DPDCHs, since the reference E-TFC does not reflect the actual E-TFC in terms of number of data bits contained and number of E-DPDCHs required for transmission. Furthermore, the HARQ profile needs to be considered.

Therefore, for the E-TFC to be transmitted in the TTI under consideration (the $j^{th}$ E-TFC), a temporary variable $\beta_{ed,j,harq}$ is computed as follows:

$$\beta_{ed,j,harq} = \beta_{ed,ref} \sqrt{\frac{L_{e,ref}}{L_{e,j}}} \sqrt{\frac{K_{e,j}}{K_{e,ref}}} \cdot 10^{\Delta_{harq}/20};\qquad \text{Equation (5)}$$

where $L_{e,ref}$ is the number of E-DPDCHs used for the reference E-TFC, $L_{e,j}$ is the number of E-DPDCHs used for the $j^{th}$ E-TFC, $K_{e,ref}$ is the number of data bits of the reference E-TFC, $K_{e,j}$ is the number of data bits of the $j^{th}$ E-TFC, and $\Delta_{harq}$ is the HARQ offset for the specific data flow to be transmitted (so called "MAC-d flow") as signaled by higher layers (see Table 3).

TABLE 3

| Signaling values for $\Delta_{harq}$ | Power offset values $\Delta_{harq}$ [dB] |
|---|---|
| 6 | 6 |
| 5 | 5 |
| 4 | 4 |
| 3 | 3 |
| 2 | 2 |
| 1 | 1 |
| 0 | 0 |

$L_{e,ref}$ and $L_{e,j}$ represent "equivalent" number of physical channels. Normally they are equal to number of used E-DP-DCHs except for two cases:

1) 2×SF2 case: $L_{e,ref}$ and $L_{e,j}$ should be 4 instead of 2; and
2) 2×SF2+2×SF4 case: $L_{e,ref}$ and $L_{e,j}$ should be 6 instead of 4.

Therefore, the calculated $\beta_{ed,j,harq}$ must be scaled by a factor of $\sqrt{2}$ for SF=2 codes. The unquantized gain factor $\beta_{ed,k,j,uq}$ is set to $\sqrt{2} \times \Delta_{ed,j,harq}$ for E-DPDCHs using spreading factor 2 and equal to $\beta_{ed,j,harq}$ otherwise. The ratio $\beta_{ed,k,j,uq}/\beta_C$ is now quantized according to Table 4 to obtain the ratio $\beta_{ed,k}/\beta_C$.

TABLE 4

Quantized amplitude ratios
$\beta_{ed,k}/\beta_c$

168/15
150/15
134/15
119/15
106/15
95/15
84/15
75/15
67/15
60/15
53/15
47/15
42/15
38/15
34/15
30/15
27/15
24/15
21/15
19/15
17/15
15/15
13/15
12/15
11/15
9/15
8/15
7/15
6/15
5/15

During compressed frames, the E-DPDCH gain factor $\beta_{ed,k}$ needs to be scaled as follows. The factors applied for the scaling the E-DPDCH have been introduced already in the E-DPCCH section above.

For 2 ms TTI, the gain factor used for the $j^{th}$ E-TFC in a compressed frame is given by:

$$\beta_{ed,C,j} = \beta_{c,C,j} \cdot A_{ed} \cdot \sqrt{\frac{L_{e,ref}}{L_{e,j}}} \cdot \sqrt{\frac{K_{e,j}}{K_{e,ref}}} \cdot 10^{\Delta harq/20} \cdot \sqrt{\frac{N_{pilot,C}}{N_{Pilot,N}}} ; \quad \text{Equation (6)}$$

where $\beta_{c,C,j}$ is the DPCCH beta factor in compressed frames for $j^{th}$ TFC ($\beta_{c,C,j}=1$ when no DPDCH is configured), $N_{pilot,C}$ is the number of pilot bits per slot on DPCCH in compressed frames, $N_{pilot,N}$ is the number of pilot bits per slot in non-compressed frames, and $N_{slots,C}$ is the number of DTX slots in this compressed frame.

For 10 ms TTI, the gain factor used for the $j^{th}$ E-TFC in a compressed frame is given by:

$$\beta_{ed,C,j} = \beta_{c,C,j} \cdot A_{ed} \cdot \sqrt{\frac{L_{e,ref}}{L_{e,j}}} \cdot \quad \text{Equation (7)}$$

$$\sqrt{\frac{K_{e,j}}{K_{e,ref}}} \cdot 10^{\Delta harq/20} \cdot \sqrt{\frac{15 \cdot N_{pilot,C}}{N_{slots,1} \cdot N_{pilot,N}}} ;$$

where $\beta_{c,C,j}$ is the beta factor in compressed frames for the $j^{th}$ TFC (=1 when no DPDCH is configured), $N_{pilot,C}$ is the number of pilot bits per slot on DPCCH in compressed frames, $N_{pilot,N}$ is the number of pilot bits per slot in non-compressed frames, and $N_{slots,1}$ is the number of non-DTX slots in the first frame used for transmitting the data.

Note that in the 10 ms case, retransmissions on E-DPDCH also require scaling when the corresponding initial transmission overlapped a compressed frame (but the frame with the retransmission does not). When the E-DCH TTI is 10 ms and the current frame is not compressed, but is a retransmission for which the corresponding first transmission was compressed, $\beta_{ed,R,j}$ represents the gain factor that shall be applied to the $j^{th}$ E-TFC as follows:

$$\beta_{ed,R,j} = \beta_{ed,j} \cdot \sqrt{\frac{15}{N_{slots,1}}} ; \quad \text{Equation (8)}$$

where $\beta_{ed,j}$ is the gain factor used for the $j^{th}$ E-TFC in non-compressed frames.

The prior art describes the principles by which an E-TFC selection procedure should follow, but fails to describe a specific method and apparatus for determining the actual SGP. Thus, although the prior art requires the computation of an SGP, a particular method or apparatus for performing such a computation is not described. Although more than one approach for computing SGP may exist, a method and apparatus for computing an optimum, (i.e., "maximum" or "highest priority"), SGP is desired.

SUMMARY

Methods of selecting an enhanced uplink (EU) transport format combination (E-TFC) are disclosed. A maximum number of bits of scheduled data for an upcoming transmission may be determined as $$K_{e,ref} \cdot \frac{SG}{L_{e,ref} \cdot A_{ed,ref}^2 \cdot 10^{\Delta harq/10}},$$

where SG is a serving grant, $L_{e,ref}$ is the number of EU dedicated physical data channels (E-DPDCHs) used for a selected reference E-TFC, $K_{e,ref}$ is the number of data bits of the reference E-TFC, $\Delta_{harq}$ is a hybrid automatic repeat request (HARQ) offset for a specific data flow to be transmitted as signaled by higher layers, and $A_{ed,ref}$ is a ratio derived from a parameter ΔE-DPDCH signaled by higher layers for the selected reference E-TFC.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "base station" includes but is not limited to a Node-B, a site controller, an access point or any other type of interfacing device in a wireless environment.

The present invention provides a method and apparatus for determining the payload for a specific SG. Furthermore, the present invention chooses a protocol data unit (PDU) size by checking all sizes in order to maximize high priority data transmissions.

The maximum PDU is the maximum supported transport block (TB) size (or EU medium access control (MAC-e) PDU size) in the set of allowed E-TFCs.

The remaining available payload is the remaining amount of data that fits in the maximum PDU.

The SGP size is the highest payload that may be transmitted according to the SG and a selected power offset (PO).

The remaining non-scheduled payload is the remaining non-scheduled grant value (per MAC-d flow).

The non-scheduled payload is the sum, for all non-scheduled dedicated MAC (MAC-d) flows, of MIN ("remaining non-scheduled payload", non-scheduled available payload), (i.e., the smallest one of the remaining non-scheduled payload and the non-scheduled available payload).

The scheduled payload is the amount of data in the radio link control (RLC) buffer of all scheduled MAC-d flows that is allowed to be multiplexed with the highest priority selected MAC-d flow.

Power offset attribute, (in frequency division duplex (FDD)) is signaled to a WTRU. The power offset attribute represents the power offset between one or more E-DPDCHs and a reference E-DPD CH power level for a given E-TFC. The power offset attribute is set to achieve the required quality of service (QoS) in this MAC-d flow when carried alone in a MAC-e PDU and subsequently in the corresponding coded composite transport channel (CCTrCh) of an EU dedicated channel (E-DCH) type. Power offsets must be translated into Beta factors that are used in the base band (BB) to adjust the relative power levels of UL code channels such as DPDCHs and DPCCH in wideband code division multiple access (W-CDMA) FDD before feeding it into the transmitter. The reference E-DPDCH power offset is signaled to the WTRU for at least one reference E-TFC. The SG is simply an indication of the maximum E-DPDCH to DPCCH power ratio that the WTRU is allowed to use for scheduled data in the following transmission. The SG is provided to the E-TFC selection function to support the selection of the "best" format for the upcoming transmission.

While respecting the overall constraint of compliance with the SG value, the primary goal of the present invention is to select all possible power setting combinations for a given E-TFC, (depending on which data is available), and find the one combination that would result in "most" data sent, FIGS. 8A-8D, taken together, are a flow diagram of a data transmission procedure 800 in accordance with the present invention. In step 802, a MAC-d flow with a PO is selected that allows highest-priority data to be transmitted. When more than one MAC-d flow allows data of the same highest priority to be transmitted, the selection of the MAC-d flow may be performed randomly. In step 804, based on the MAC-d flow selected, the MAC-d flow(s) that can be multiplexed are identified and the MAC-d flow(s) that cannot be multiplexed are ignored. In step 806, based on the PO selected, E-TFC restriction is performed and the maximum supported payload, (i.e., maximum MAC-e PDU size), that can be sent in the next transmission timing interval (TTI) is determined. In step 808, the "Remaining Available Payload" is set to the maximum supported payload. In step 810, if the upcoming transmission overlaps with a compressed mode (CM) gap on 10 ms TTI, the current SG is scaled down.

CM is special in that parts of the frame are sent at a higher power, as compared to normal uncompressed frames. Therefore, the SG must be "scaled" to take the presence of CM into account, by serving as a numerical adjustment. The DPCCH power assumed for the SG in a compressed frame is the actual DPCCH power in the compressed frame minus the "pilot power".

In step 812, the scheduled grant payload (SGP) is set to the highest payload that can be transmitted according to the SG and the selected PO as follows:

$$SG = \left(\frac{\beta_{ed,j,harq}}{\beta_c}\right)^2 \frac{SGP}{TBsize}; \text{ and} \qquad \text{Equation (9)}$$

$$SGP = \frac{SG \times TBsize \times \beta_c^2}{\beta_{ed,j,harq}^2}; \qquad \text{Equation (10)}$$

where TBsize is the maximum supported payload (transport block size) and j is the considered TFC that supports the maximum supported payload. The SG=MIN(SGP, TBsize). $\beta_c$ is the gain factor of the DPCCH. As previously disclosed:

$$\beta_{ed,ref} = \beta_c \cdot A_{ed,ref}; \text{ and} \qquad \text{Equation (4)}$$

$$\beta_{ed,j,harq} = \beta_{ed,ref} \sqrt{\frac{L_{e,ref}}{L_{e,j}}} \sqrt{\frac{K_{e,j}}{K_{e,ref}}} \cdot 10^{\Delta harq/20}. \qquad \text{Equation (5)}$$

Thus, when $\beta_c \cdot A_{ed,ref}$ of Equation (4) is substituted in Equation (5) for $\beta_{ed,ref}$:

$$\beta_{ed,j,harq}^2 = \beta_c^2 \cdot A_{ed,ref}^2 \cdot \frac{L_{e,ref}}{L_{e,j}} \cdot \frac{K_{e,j}}{K_{e,ref}} \cdot 10^{(\Delta harq/20)^2}; \qquad \text{Equation (11)}$$

where $10^{(\Delta harq/20)^2} = 10^{\Delta harq/10}$. \qquad Equation (12)

In accordance with the present invention, $$\frac{\beta_c^2}{\beta_{ed,j,harq}^2} = \frac{1}{A_{ed,ref}^2} \cdot \frac{L_{e,j}}{L_{e,ref}} \cdot \frac{K_{e,ref}}{K_{e,j}} \cdot \frac{1}{10^{\Delta harq/10}} ; \text{ and} \quad \text{Equation (13)}$$

$$SGP = \frac{SG \cdot TBSize}{1} \cdot \frac{1}{A_{ed,ref}^2} \cdot \frac{L_{e,j}}{L_{e,ref}} \cdot \frac{K_{e,ref}}{k_{e,j}} \cdot \frac{1}{10^{\Delta harq/10}} \quad \text{Equation (14)}$$

$$= K_{e,ref} \cdot \frac{SG}{L_{e,ref} \cdot A_{ed,ref}^2 \cdot 10^{\Delta harq/10}} \cdot \frac{TBSize \cdot L_{e,j}}{K_{e,j}}. \quad \text{Equation (15)}$$

In accordance with one preferred embodiment of the present invention, the factor $$\frac{TBSize \cdot L_{e,j}}{K_{e,j}}$$

will always result in the closest possible quantized value to 1 as part of the iterative procedure described above in the present invention, and thus $$SGP = K_{e,ref} \cdot \frac{SG}{L_{e,ref} \cdot A_{ed,ref}^2 \cdot 10^{\Delta harq/10}}. \quad \text{Equation (16)}$$

This is easily seen when considering that $L_{e,j}$ is the number of E-DPDCHs used for the $j^{th}$ E-TFC as described earlier.

For example, but not limited to this specific case, $L_{e,j}=1$ in the case of HSUPA WTRU Category 1 where only 1 E-DPDCH with an SF not smaller than 4 is possible. Because $K_{e,j}$ is the number of data bits of the $j^{th}$ E-TFC under consideration, the factor that maximizes the throughput as described is when the factor TBSize/$K_{e,j}$ is the closest possible quantized value to 1 as a function of the configured E-TFCSs.

In other cases where $L_{e,j}$ is not equal to 1, as a function of the number of E-DPDCHs and possibly their respective SFs as described earlier, the SGP in Equations (15) and (16) will yield values that do not exceed a transport block size, (i.e., TBSize), that corresponds to a higher reference E-TFC and that is not lower than the specific reference E-TFC used in the computation, unless the specific reference E-TFC is the smallest one.

Figures 8, 8A:
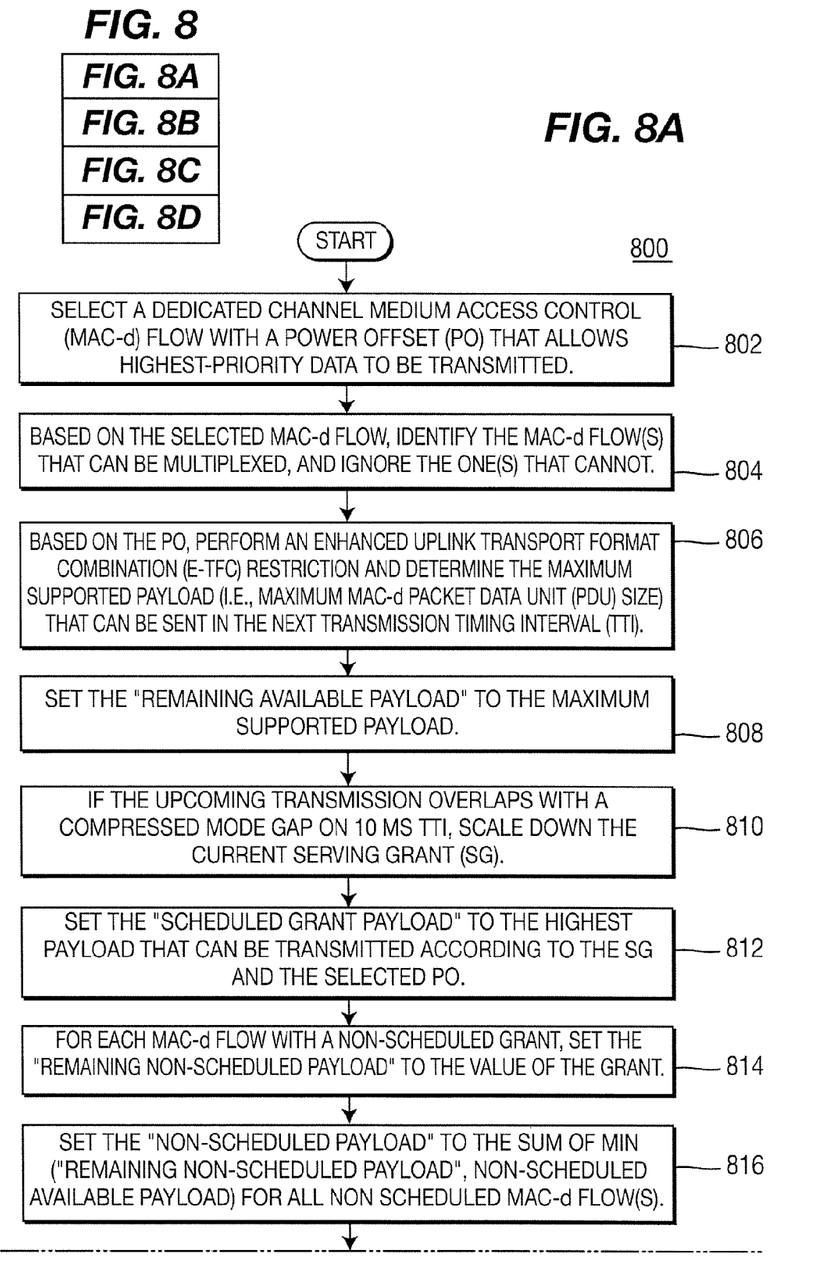
FIGS. 8A-8D, taken together, are a flow diagram of a process for data transmission in accordance with the present invention.
Figure 8B:
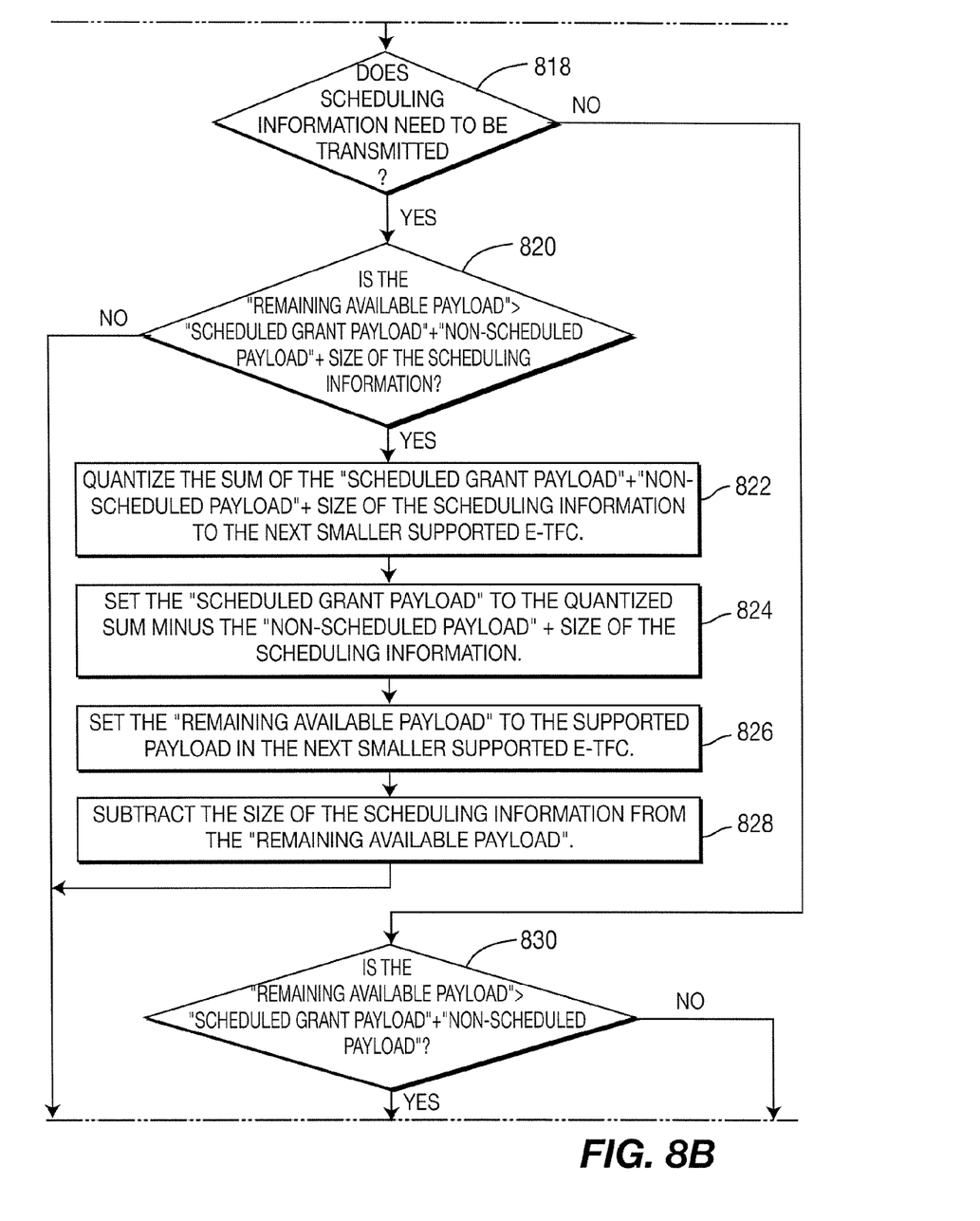
Figure 8C:
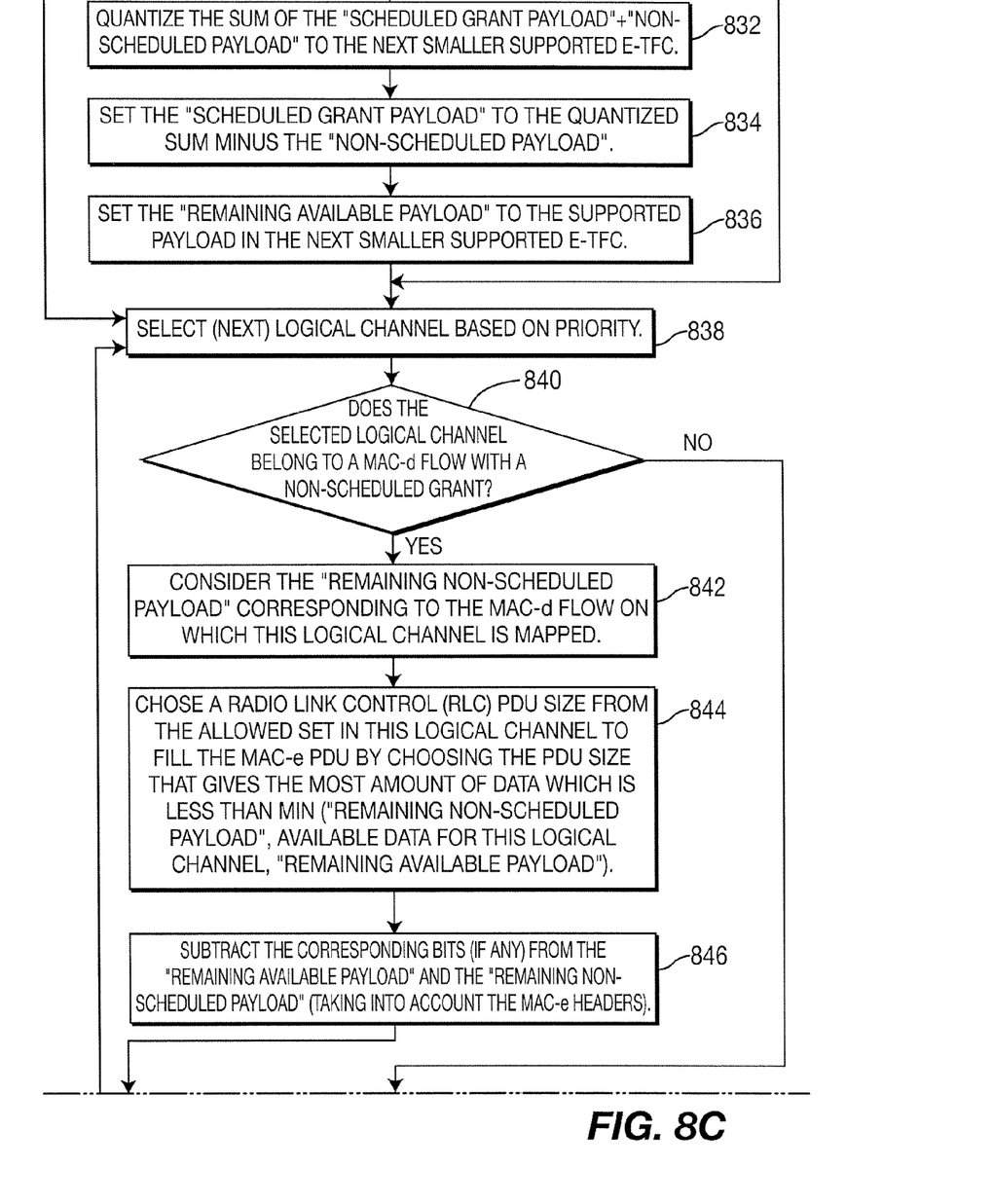
Figure 8D:
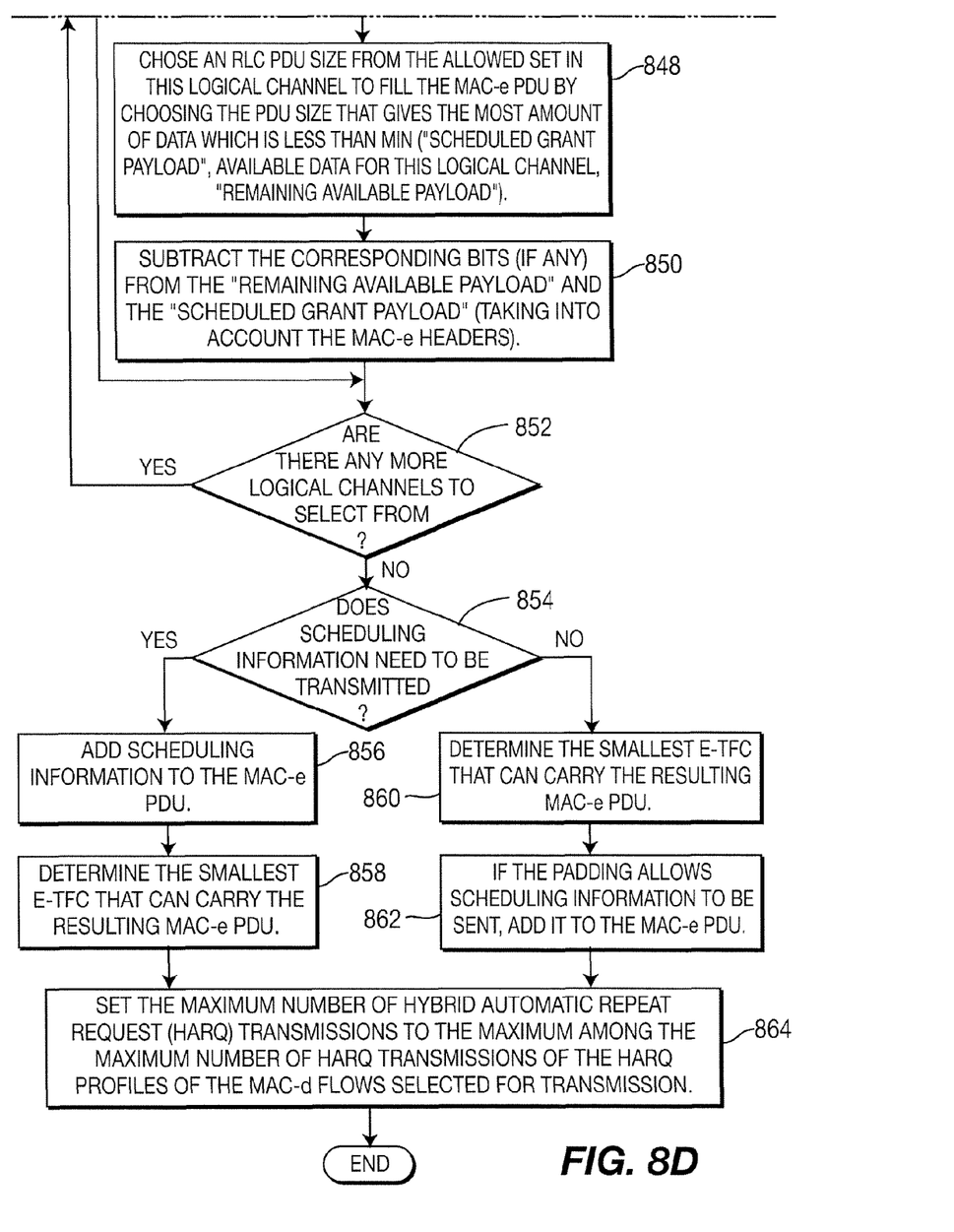

Referring still to FIG. 8, in step 814, for each MAC-d flow with a non-scheduled grant, the "Remaining Non-scheduled Payload" is set to the value of the grant. In step 816, the "Non scheduled Payload" is set to the sum of MIN ("Remaining Non-scheduled Payload", non-scheduled available payload) for all non scheduled MAC-d flow(s).

If it is determined in step 818 that scheduling information needs to be transmitted, and if in step 820 the "Remaining Available Payload" is determined to be greater than the sum of the "Scheduled Grant Payload", the "Non-scheduled Payload" and the size of the scheduling information, (i.e., the TB size can carry all of the data the WTRU can possibly send), the sum of the "Scheduled Grant Payload"+"Non-scheduled Payload"+size of the scheduling information is quantized to the next smaller supported E-TFC (step 822). In step 824, the "Scheduled Grant Payload" is set to the quantized sum minus the "Non-scheduled Payload" and the size of the scheduling information. In step 826, the "Remaining Available Payload" is set to the supported payload in the next smaller supported E-TFC. In step 828, the size of the Scheduling Information is subtracted from the "Remaining Available Payload".

If it is determined in step 818 that scheduling information does not need to be transmitted, and if the "Remaining Available Payload" is determined in step 830 to be greater than the sum of the "Scheduled Grant Payload" and the "Non-scheduled Payload" (i.e., the TB size can carry all of the data the WTRU can possibly send), the sum of the "Scheduled Grant Payload" and the "Non-scheduled Payload" is quantized to the next smaller supported E-TFC (step 832), the "Scheduled Grant Payload" is set to the quantized sum minus the "Non-scheduled Payload" (step 834) and the "Remaining Available Payload" is set to the supported payload in the next smaller supported E-TFC (step 836).

Still referring to FIG. 8, one of a plurality of logical channels is selected based on an order of priority (step 838), and then steps 840-850 are performed for the selected logical channel before looping back to step 838 if it is determined in step 852 that there is at least one more logical channel from which to select. In step 840, a determination is made as to whether the selected logical channel belongs to a MAC-d flow with a non-scheduled grant.

If the determination of step 840 is positive, the "Remaining Non-scheduled Payload" corresponding to the MAC-d flow on which this logical channel is mapped is considered (step 842), and an RLC PDU size is chosen from the allowed set in the selected logical channel to fill the MAC-e PDU by choosing the PDU size that gives the most amount of data which is less than MIN("Remaining Non-scheduled Payload", Available Data for this logical channel, "Remaining Available Payload") (step 844). In order to check which PDU size provides the largest amount of data, it is necessary to check for every size allowed. In step 846, the corresponding bits if any are subtracted from the "Remaining Available Payload" and the "Remaining Non-scheduled Payload" (taking into account the MAC-e headers).

If the determination of step 840 is negative, an RLC PDU size is chosen from the allowed set in the selected logical channel to fill the MAC-e PDU by choosing the PDU size that gives the most amount of data which is less than MIN ("Scheduled Grant Payload", Available Data for this logical channel, "Remaining Available Payload") (step 848). In order to check which PDU size provides the largest amount of data, it is necessary to check for every size allowed. In step 850, the corresponding bits if any are subtracted from the "Remaining Available Payload" and the "Scheduled Grant Payload" (taking into account the MAC-headers).

If it is determined in step 852 that there are no more logical channels to select from, and if it is determined in step 854 that scheduling information needs to be transmitted, scheduling information is added to the MAC-e PDU (step 856) and the smallest E-TFC that can carry the resulting MAC-e PDU is determined (step 858).

If it is determined in step 854 that scheduling information does not need to be transmitted, the smallest E-TFC that can carry the resulting MAC-e PDU is determined (step 860) and if the padding allows scheduling information to be sent, it is added to the MAC-e PDU (step 862). Finally, in step 864, the maximum number of hybrid automatic repeat request (HARQ) transmissions is set to the maximum among the maximum number of HARQ transmissions of the HARQ profiles of the MAC-d flows selected for transmissions.

Figure 9:
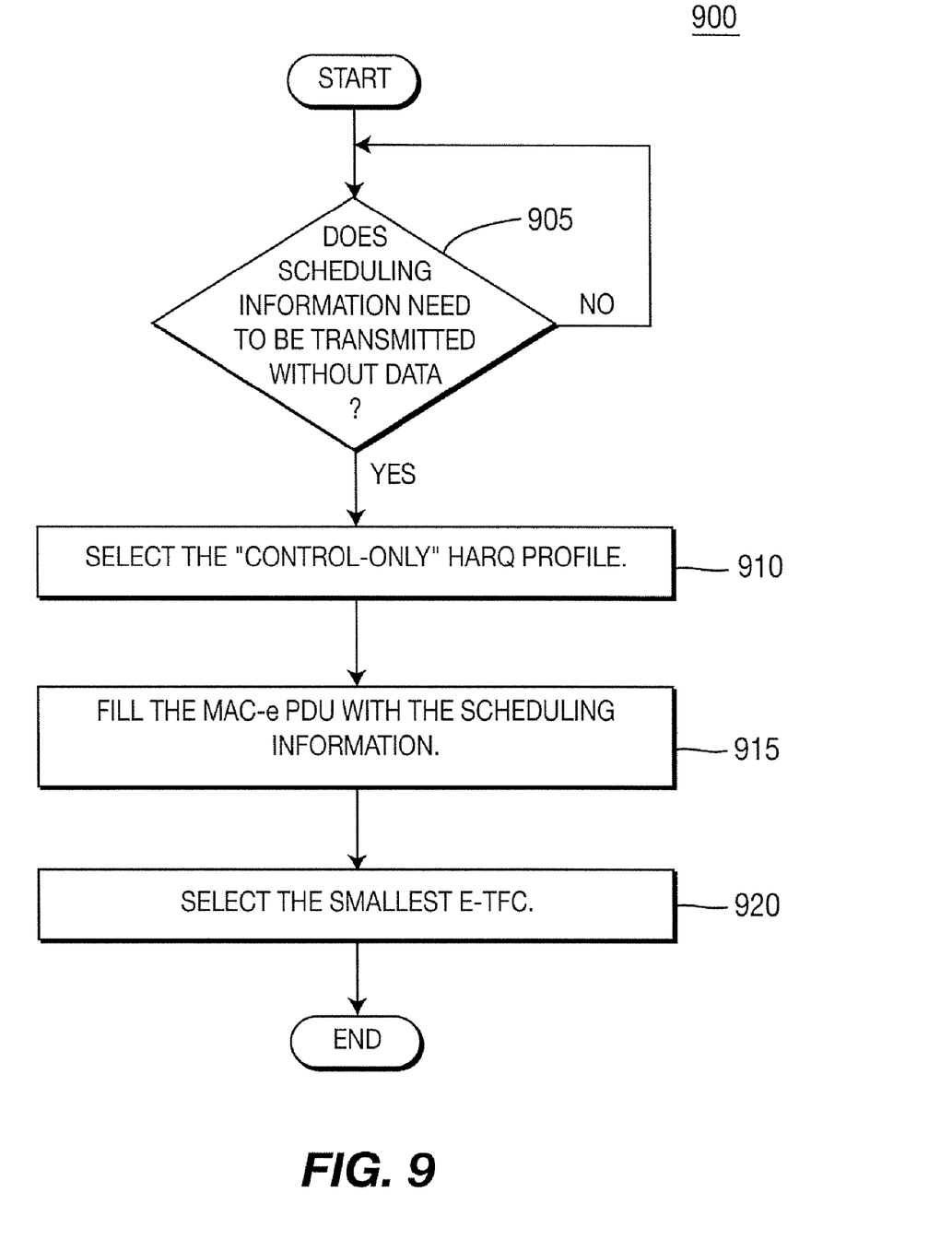
FIG. 9 is a flow diagram of a process for scheduling information without data in accordance with the present invention.

FIG. 9 is a flow diagram of a data-less scheduling information transmission procedure 900 in accordance with the present invention. If in step 905 it is determined that scheduling information is to be transmitted without data, the "control-only" HARQ profile is selected (step 910), the MAC-e PDU is filled with the scheduling information (step 915) and the smallest E-TFC is selected (step 920). When the scheduling information is sent alone (no data), then the PO to be used is the one configured by an RRC in the information element (IE) "Power Offset for Scheduling Information" in the "E-DPDCH Info." This is part of an RRC-layer signaled configuration information for enhanced UL, whereby the RNC signals parameters to the WTRU for setting up and running the e-MAC.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of selecting an enhanced uplink (EU) transport format combination (E-TFC), the method comprising:
   determining a maximum number of bits of scheduled data for an upcoming transmission calculated from $K_{e,ref}$, wherein the highest value is lower or equal to:

$$K_{e,ref} \cdot \frac{SG}{L_{e,ref} \cdot A_{ed,ref}^2 \cdot 10^{\Delta harq/10}},$$

where SG is a serving grant, $L_{e,ref}$ is the number of EU dedicated physical data channels (E-DPDCHs) used for a selected reference E-TFC, $K_{e,ref}$ is the number of data bits of the reference E-TFC, $\Delta_{harq}$ is a hybrid automatic repeat request (HARQ) offset for a specific data flow to be transmitted as signaled by higher layers, and $A_{ed,ref}$ is a ratio derived from a parameter ΔE-DPDCH signaled by higher layers for the selected reference E-TFC.

2. The method of claim 1, wherein a power offset (PO) for the upcoming transmission is the PO from a HARQ profile of a medium access control (MAC-d) flow that allows highest-priority data to be transmitted.

3. The method of claim 2, wherein on a condition that more than one MAC-d flow allows data of the same highest priority to be transmitted, the selection of the MAC-d flow is performed randomly.

4. The method of claim 1, wherein SG=MIN(SGP, TBsize), where SGP is the maximum number of bits of scheduled data for an upcoming transmission and TBsize is a transport block size that provides a maximum supported payload.

5. The method of claim 1, further comprising:
   performing E-TFC restriction; and
   determining a maximum supported payload that can be sent in a next transmission timing interval (TTI).

6. A wireless transmit/receive unit (WTRU) configured to select an enhanced uplink (EU) transport format combination (E-TFC), the WTRU configured to:
   determine a maximum number of bits of scheduled data for an upcoming transmission calculated from $K_{e,ref}$, wherein the highest value is lower or equal to:

$$K_{e,ref} \cdot \frac{SG}{L_{e,ref} \cdot A_{ed,ref}^2 \cdot 10^{\Delta harq/10}},$$

where SG is a serving grant, $L_{e,ref}$ is the number of EU dedicated physical data channels (E-DPDCHs) used for a selected reference E-TFC, $K_{e,ref}$ is the number of data bits of the reference E-TFC, $\Delta_{harq}$ is a hybrid automatic repeat request (HARQ) offset for a specific data flow to be transmitted as signaled by higher layers, and $A_{ed,ref}$ is a ratio derived from a parameter ΔE-DPDCH signaled by higher layers for the selected reference E-TFC.

7. The WTRU of claim 6, wherein the WTRU is further configured to:
   select a power offset (PO) for the upcoming transmission as the PO from a HARQ profile of a medium access control (MAC-d) flow that allows highest-priority data to be transmitted.

8. The WTRU of claim 7, wherein on a condition that more than one MAC-d flow allows data of the same highest priority to be transmitted, the WTRU is further configured to select the MAC-d flow randomly.

9. The WTRU of claim 6, wherein SG=MIN(SGP, TBsize), where SGP is the maximum number of bits of scheduled data for an upcoming transmission and TBsize is a transport block size that provides a maximum supported payload.

10. The WTRU of claim 6, wherein the WTRU is further configured to:
    perform E-TFC restriction; and
    determine a maximum supported payload that can be sent in a next transmission timing interval (TTI).

11. A method of selecting an enhanced uplink (EU) transport format combination (E-TFC), the method comprising:
    determining a maximum number of bits of scheduled data for an upcoming transmission, wherein the highest value is lower or equal to a product of:
    a ratio of the serving grant (SG) over the number of EU dedicated physical data channels (E-DPDCHs) used for a selected reference E-TFC, a hybrid automatic repeat request (HARQ) offset for a specific data flow to be transmitted as signaled by higher layers, and a ratio derived from a parameter ΔE-DPDCH signaled by higher layers for the selected reference E-TFC; and the number of data bits of the reference E-TFC.

12. The method of claim 11, wherein a power offset (PO) for the upcoming transmission is the PO from a HARQ profile of a medium access control (MAC-d) flow that allows highest-priority data to be transmitted.

13. The method of claim 12, wherein on a condition that more than one MAC-d flow allows data of the same highest priority to be transmitted, the selection of the MAC-d flow is performed randomly.

14. The method of claim 11, wherein SG=MIN(SGP, TBsize), where SGP is the maximum number of bits of scheduled data for an upcoming transmission and TBsize is a transport block size that provides a maximum supported payload.

15. The method of claim 11, further comprising:
performing E-TFC restriction; and
determining a maximum supported payload that can be sent in a next transmission timing interval (TTI).

* * * * *